United States Patent [19]

Clarke

[11] 4,104,257
[45] Aug. 1, 1978

[54] PROCESS FOR PREPARING HIGH MOLECULAR WEIGHT POLYETHER RESINS FROM BISPHENOLS AND EPOXY RESINS

[75] Inventor: James Albert Clarke, Lake Jackson, Tex.

[73] Assignee: The Dow Chemical Company, Midland, Mich.

[21] Appl. No.: 819,321

[22] Filed: Jul. 27, 1977

[51] Int. Cl.$^2$ .................. C08G 59/62; C08G 59/00
[52] U.S. Cl. .................................................. 528/102
[58] Field of Search .................................... 260/47 EP

[56] References Cited

U.S. PATENT DOCUMENTS

| | | | |
|---|---|---|---|
| 3,277,048 | 10/1966 | Sonnabend | 260/47 |
| 3,306,872 | 2/1967 | Maycock et al. | 260/32.8 |
| 3,336,257 | 8/1967 | Alvey et al. | 260/47 |
| 3,379,684 | 4/1968 | Wiesner et al. | 260/47 |
| 3,477,990 | 11/1969 | Dante et al. | 260/47 |
| 3,637,590 | 1/1972 | Maycock et al. | 260/47 EP |

Primary Examiner—Harold D. Anderson
Assistant Examiner—E. A. Nielsen
Attorney, Agent, or Firm—James G. Carter

[57] ABSTRACT

A process for preparing thermoplastic polyether resins from bisphenols, particularly having significant quantities of the o, p- or o, o-isomers such as bisphenol A and epoxy resins such as the diglycidyl ether of bisphenol A is improved by the addition of small quantities of a halogenated bisphenol such as tetrabromobisphenol A preferably near the end of the reaction. The process provides a product higher in molecular weight than that obtained without the use of the halogenated bisphenol.

6 Claims, No Drawings

PROCESS FOR PREPARING HIGH MOLECULAR WEIGHT POLYETHER RESINS FROM BISPHENOLS AND EPOXY RESINS

BACKGROUND OF THE INVENTION

This invention relates to a process for preparing polyhydroxy ethers by reacting a bisphenol with an epoxy resin.

High molecular weight resins have been prepared from bisphenols and epoxy resins as disclosed in various U.S. patents such as U.S. Pat. No. 3,306,872; 3,379,684 and 3,637,590. Such resins which are prepared from essentially pure bisphenols, e.g., those containing very small quantities of the ortho-para and ortho-ortho isomers produce high molecular weight resins whereas those resins which are prepared employing significant quantities of the ortho-ortho and ortho-para isomers have a relatively lower molecular weight. It has been discovered that the molecular weight of resins prepared from bisphenols having significant quantities of the ortho-para and ortho-ortho isomers can be increased by the process of the present invention. Those resins prepared from essentially pure P,P' bisphenols can also be improved by the process of this invention.

SUMMARY OF THE INVENTION

The present invention therefore pertains to a process for preparing high molecular weight polyhydroxyether resins by reacting in the presence of a suitable quantity of a suitable solvent or reaction medium; (A) an epoxy resin having an average of more than one epoxy group per molecule with (B) a bisphenol, particularly a bisphenol containing at least about 1 equivalent % of the ortho-para and ortho-ortho isomers in the presence of (C) a catalytic quantity of a suitable catalyst which process is improved by adding after the reaction between Components (A) and (B) is at least about 97% preferably at least about 98% complete based upon the phenolic hydroxyl content (D) from about 0.005 to about 0.12, preferably from about 0.01 to about 0.05 phenolic OH equivalents of a halogenated bisphenol per total phenolic OH equivalents contained in (B) and (D).

DETAILED DESCRIPTION OF THE PREFERRED EMBODIMENTS

Suitable epoxy resins which can be employed as Component (A) in the process of the present invention are the glycidyl ethers of bisphenols such as, for example, those represented by the formula $$H_2C\overset{O}{-\!\!\!-\!\!\!-}CH-CH_2-O-\underset{B}{\overset{B}{\bigcirc}}-(A)_n-\underset{B}{\overset{B}{\bigcirc}}-O\left[CH_2-\underset{OH}{CH}-CH_2-O-\underset{B}{\overset{B}{\bigcirc}}-(A)_n-\underset{B}{\overset{B}{\bigcirc}}-O-CH_2-\overset{O}{CH}-CH_2\right]_m$$

wherein each A is independently selected from a divalent hydrocarbon group containing from 1 to about 8 carbon atoms, —O—, —S—, —S—S—, $$-\underset{\underset{O}{\overset{O}{\|}}}{\overset{O}{\overset{\|}{S}}}- \text{ or } -\overset{O}{\overset{\|}{C}}-;$$

each B is independently selected from hydrogen, chlorine, bromine or an alkyl group containing from 1 to about 4 carbon atoms, $n$ has a value of zero or one and $m$ has an average value of from zero to about 2, preferably from about zero to about 0.75.

Suitable bisphenols which can be employed as component (B) in the process of the present invention are represented by the following formula $$HO-\underset{B'}{\overset{B'}{\bigcirc}}-(A)_n-\underset{B'}{\overset{B'}{\bigcirc}}-OH$$

wherein A and $n$ are as defined above and B' is selected from hydrogen or an alkyl group having from 1 to about 4 carbon atoms.

Suitable halogenated bisphenols which can be employed as component (D) in the process of the present invention are represented by the formula $$HO-\underset{X'}{\overset{X}{\bigcirc}}-(A)_n-\underset{X'}{\overset{X}{\bigcirc}}-OH$$

wherein A and $n$ are as defined above, each X is independently chlorine or bromine and each X' is independently hydrogen, chlorine, bromine or an alkyl group having from 1 to about 4 carbon atoms.

Suitable catalysts which can be employed as Component (C) in the process of the present invention include any catalyst which will catalyze the reaction between a vicinal epoxy group and a phenolic hydroxyl group. Such catalysts include, for example, those disclosed in U.S. Pat. Nos. 3,306,872; 3,379,684; 3,477,990; 3,547,881; 3,637,590; 3,948,855 which are incorporated herein by reference.

Particularly preferred catalysts are those quaternary phosphonium compounds having as the anion portion, a halide or a carboxyl group such as, for example, ethyltriphenylphosphonium chloride, ethyltriphenylphosphonium bromide, ethyltriphenylphosphonium iodide, ethyltriphenylphosphonium acetate, ethyltriphenylphosphonium diacetate (ethyltriphenylphosphonium acetate acetic acid complex), tetrabutylphosphonium chloride, tetrabutylphosphonium bromide, tetrabutylphosphonium iodide, tetrabutylphosphonium acetate, and tetrabutylphosphonium diacetate (tetrabutylphosphonium acetate acetic acid complex). Those having a carboxyl group as the anion, such as for example, ethyltriphenylphosphonium diacetate, are most preferred.

The quantities of epoxy resin and bisphenol compounds employed are that required to obtain the desired molecular weight and are usually employed in such quantities as will provide an epoxide:total phenolic hydroxyl ratio of from about 1.15:1 to about 0.97:1, preferably from about 1.06:1 to about 0.99:1.

The quantity of catalyst employed depends upon the particular reactants and catalyst being utilized and is usually in the range of from about 0.1 to about 10 millimoles, preferably from about 0.2 to about 6 millimoles per equivalent of the epoxide reactant.

Higher quantities of catalyst are desired when higher molecular weight products are to be prepared.

Suitable solvents or inert reaction media which are employed in the present invention include ketones, ethers and the like such as, for example, acetone, methyl ethyl ketone, cyclohexanone, mesityloxide, dioxane, tetrahydrofuran, dimethoxyethane, lower alkyl ethers of ethylene or propylene glycol, mixtures thereof and the like.

Any solvent or reaction medium is suitable so long as it maintains the reactants and reaction products in solution or intimate suspension at the reaction temperature employed and which will not react significantly with the reactants or reaction products or the catalyst and which can be readily removed, if desired from the reaction product.

The solvent is conveniently employed in quantities of from about 20 to about 100, preferably from about 30 to about 50 parts by weight per 100 parts of epoxy resin (Component A) employed.

The temperature at which the reaction can be conducted depends upon the particular reactants and catalysts employed but usually ranges from about 120° to about 220° C, preferably from about 130° to about 160° C.

The higher the temperature and the higher the concentration of catalyst, the less time that is required for the reaction to reach a specific degree of completion.

The following examples are illustrative of the invention but are not to be construed as to limiting the scope of the invention in any manner.

The following components were employed in the examples.

Epoxy Resin A was the glycidyl ether of bisphenol A having an epoxide equivalent weight of 182.5.

Pure bisphenol A (PBPA) was bisphenol A having an ortho-para isomer content of 0.2% and an ortho-ortho' isomer content of less than 0.01%.

Impure bisphenol A (IPBPA) was bisphenol A having an ortho-para isomer content of 2.2% and an ortho-ortho' isomer content of less than 0.02%.

Catalyst A was a 70% solution of ethyltriphenylphosphonium diacetate in methanol.

Tetrabromobisphenol A (TBBPA) had an OH equivalent weight of 272.

Tetrachlorobisphenol A (TCBPA) had an OH equivalent weight of 183.

The following definitions apply to the abbreviations employed in the tables.

$\overline{M_w}$ = weight average molecular weight as determined by gel permeation chromatography.

$\overline{M_n}$ = number average molecular weight as determined by gel permeation chromatography.

$\overline{DP}$ = degree of polymerization calculated in the following manner.

$$\overline{DP} = \frac{\text{Total equivalents of reactants charged at the time of making the calculation.}}{(\text{Equiv. of Epoxide remaining}) + (\text{Equiv. of Phenolic OH Remaining})}$$

N.A. — Not applicable
N.D. = Not Determined

For purposes of illustration, the $\overline{DP}$ and percent completion for Example 2 are calculated below.

At Time of Additon
% Completion Based on Remaining Epoxy Equiv.
$$\frac{1.02 - .038}{1.02} \times 100 = \frac{0.982}{1.02} \times 100 = 96.27\%$$
% Completion based on Remaining Phenolic OH Equiv.
$$\frac{0.98 - 0.020}{0.98} \times 100 = \frac{0.96}{.98} \times 100 = 97.96\%$$
% Completion Based on Remaining Epoxy Plus Phenolic OH Equiv.
$$\frac{(1.02 + .98) - (0.038 + 0.020)}{(1.02 + .98)} \times 100 =$$
$$\frac{2 - .058}{2} \times 100 = \frac{1.942}{2} \times 100 = 97.1\%$$
$$\overline{DP} = \frac{1.02 + 0.98}{0.038 + 0.020} = \frac{2}{0.058} = 34.48$$

PRODUCT
% Completion Based on Epoxy Equiv.
$$\frac{1.02 - 0.016}{1.02} \times 100 = \frac{1.004}{1.02} \times 100 = 98.43\%$$
% Completion Based on Phenolic OH Equiv.
$$\frac{(0.98 + 0.02) - 0.0155}{0.98 + 0.02} \times 100 = \frac{0.9845}{1} \times 100 = 98.45\%$$
% Completion Based on Epoxy Plus Phenolic OH Equiv.
$$\frac{(1.02 + 0.98 + 0.02) - (0.016 + 0.0155)}{1.02 + 0.98 + 0.02} \times 100 =$$
$$\frac{1.9885}{2.02} \times 100 = 98.44\%$$
$$\overline{DP} = \frac{1.02 + 0.98 + 0.02}{0.016 + 0.0155} = \frac{2.02}{0.0315} = 64.13$$

In the following examples and comparative experiments, the equivalents epoxide in the reaction mixture was determined by titration employing the method described by R. R. Jay, *Anal. Chem.*, Vol. 36, No. 3, pp 667–668 (March 1964) using perchloric acid titrant plus tetraethylammonium bromide reagent.

In the following example and comparative experiments, the equivalents of phenolic OH in the reaction mixture was determined by the following potentiometric procedure.

A sample containing about 0.1 meq. phenolic OH is dissolved in 20 grams dimethylformamide.

75 ml. of dimethylformamide is measured into a beaker with stirrer and two drops of o-nitroaniline are added. This is stirred, purging with nitrogen to sweep out entrapped air (carbon dioxide will titrate). The weighed sample is added to the beaker, then titrated potentiometrically with a 0.1M solution of n-tetrabutylammonium hydroxide in toluene solvent. Enough methanol (10% by weight) is included in with the toluene solvent to keep the system miscible. The endpoint is taken as the center of the break in the titration curve that corresponds to a color change in the indicator from yellow to orange.

ued for an additional 4 hours. The results are given in the following Table I.

TABLE I

| Example or Comparative Experiment Number | Epoxy Resin Type A Equiv. | Bisphenol A | | Catalyst, Type A Millimoles Per Epxoy Equiv. | Halogenated Bisphenol A | |
|---|---|---|---|---|---|---|
| | | Type | Equiv. | | Type | Equiv. |
| Comp. Expt. A | 1.02 | IPBPA | 1.0 | 3 | None | — |
| Example 1 | 1.02 | IPBPA | 0.99 | 3 | TBBPA | 0.01 |
| Example 2 | 1.02 | IPBPA | 0.98 | 3 | TBBPA | 0.02 |
| Example 3 | 1.02 | IPBPA | 0.96 | 3 | TBBPA | 0.04 |
| EXAMPLE 4 | 1.02 | IPBPA | 0.98 | 3 | TCBPA | 0.02 |
| Comp. Expt. B | 1.02 | IPBPA | 1.0 | 1.5 | None | — |
| Example 5 | 1.02 | IPBPA | 0.98 | 1.5 | TBBPA | 0.02 |

| | At Time of Addition of Halogenated Bisphenol | | | | |
|---|---|---|---|---|---|
| Example or Comparative Experiment Number | Epoxy Equiv. | Phenolic Hydroxyl Equiv. | % Completion Based upon Remaining epoxy equiv. | % Completion Based upon remaining phenolic hydroxyl equiv. | % Completion Based upon remaining epoxy plus phennolic hydroxyl equiv. |
| Comp. Expt. A | 0.033* | 0.027* | 96.76* | 97.3* | 97.03* |
| Example 1 | 0.029 | N.D. | 97.16 | N.D. | N.D. |
| Example 2 | 0.038 | 0.020 | 96.27 | 97.96 | 97.10 |
| Example 3 | 0.0495 | N.D. | 95.15 | N.D. | N.D. |
| Example 4 | 0.035 | N.D. | 96.57 | N.D. | N.D. |
| Comp. Expt. B | N.D. | N.D. | N.D. | N.D. | N.D. |
| Example 5 | 0.046 | N.D. | 95.49 | N.D. | N.D. |

| | Analysis of Product | | | | | | | | |
|---|---|---|---|---|---|---|---|---|---|
| Example or Comparative Experiment Number | $\overline{M}_w$ | $\overline{M}_n$ | $\overline{M}_w/\overline{M}_n$ | Epoxy Equiv. | Phenolic OH Equiv. | DP | % Completion Based upon Remaining Epoxy Equiv. | % Completion Based upon Remaining Phenolic Hydroxyl Equiv. | % Completion Based upon Remaining epoxy plus Phenolic Hydroxyl Equiv. |
| Comp. Expt. A | 24100 | 6500 | 3.7 | 0.026 | 0.024 | 40 | 97.45 | 97.6 | 97.52 |
| Example 1 | 36800 | 8110 | 4.5 | 0.016 | 0.0185 | 59 | 98.43 | 98.15 | 98.29 |
| Example 2 | 42900 | 8830 | 4.85 | 0.016 | 0.0155 | 64 | 98.43 | 98.45 | 98.44 |
| Example 3 | 57900 | 11035 | 5.2 | 0.0098 | 0.0127 | 90 | 99.04 | 98.73 | 98.89 |
| Example 4 | 44000 | 6870 | 6.4 | 0.0135 | 0.0153 | 70 | 98.68 | 98.47 | 98.57 |
| Comp. Expt. B | 24400 | 7090 | 3.45 | 0.029 | 0.027 | 36 | 97.16 | 97.3 | 97.23 |
| Example 5 | 31000 | 7840 | 3.95 | 0.0225 | 0.020 | 48 | 97.79 | 98.0 | 97.9 |

*After 3 hours (No halogenated bisphenol was employed).

Prior to adding the sample, the contents of the beaker are neutralized to this orange color with a few drops of titrant. This accounts for $CO_2$ or other acidic components dissolved in the dimethylformamide.

EXAMPLES 1-5 AND COMPARATIVE EXPERIMENTS A-B

In a series of experiments, the epoxy resin and bisphenol were charged to a reactor and mixed with 30 parts of the ethyl ether of ethylene glycol (DOWANOL EE) as an inert reaction solvent and an appropriate catalyst was added. The contents of the reactor were heated to a temperature of 135° C for 3 hours at which time the indicated quantity of tetrabromobisphenol A or tetrachlorobisphenol A was added and the reaction contin-

EXAMPLES 6-10 AND COMPARATIVE EXPERIMENTS C-I

Another series of experiments was performed which varied the time of addition of the halogenated bisphenol as well as other experiments. In each of these experiments, the reactants and procedure were essentially the same as that employed previously except that the reaction temperature was 132° C and as otherwise noted. The solvent employed was the same as that previously employed, the quantity being 150 grams. The time of reaction was 7 hours in all instances except for Comparative Experiments C and E which were 5 hours at which time the reactions were considered to be essentially complete. The results are given in the following Table II.

TABLE II

| Example or Comparative Experiment Number | Epoxy Resin Equiv. | Bisphenol A | | Catalyst, Type A Millimoles Per Epoxy Equiv. | Halogenated Bisphenol A | | |
|---|---|---|---|---|---|---|---|
| | | Type | Equiv. | | Type | Equiv. | When Added[1] |
| Comp. Expt. C | 1.02 | IPBPA | 1.0 | 3 | None | — | — |
| Comp. Expt. D | 1.02 | IPBPA | 0.98 | 3 | IPBPA[2] | 0.02 | 3 hours |
| Comp. Expt. E | 1.02 | IPBPA | 0.98 | 3 | TBBPA | 0.02 | at start[3] |
| Comp. Expt. F | 1.02 | IPBPA | 0.98 | 3 | TBBPA | 0.02 | 0.5 hours |
| Comp. Expt. G | 1.02 | IPBPA | 0.98 | 3 | TBBPA | 0.02 | 1.25 hours |
| Comp. Expt. H | 1.02 | IPBPA | 0.98 | 3 | TBBPA | 0.02 | 1⅜ hours |
| Comp. Expt. I | 1.02 | PBPA | 1.00 | 3 | None | — | — |
| Example 6 | 1.02 | IPBPA | 0.98 | 3 | TBBPA | 0.02 | 2.25 hours |
| Example 7 | 1.02 | IPBPA | 0.98 | 3 | TBBPA | 0.02 | 3 hours |
| Example 8 | 1.02 | IPBPA | 0.95 | 3 | TBBPA | 0.05 | 3 hours |
| Example 9 | 1.02 | IPBPA | 0.92 | 3 | TBBPA | 0.08 | 3 hours |
| Example 10 | 1.02 | PBPA | 0.98 | 3 | TBBPA | 0.02 | 3 hours |

TABLE II-continued

At Time of Addition of Halogenated Bisphenol

| Example or Comparative Experiment Number | Epoxy Equiv. | Phenolic Hydroxyl Equiv. | DP | % Completion Based upon Remaining epoxy equiv. | % Completion Based upon remaining phenolic hydroxyl equiv. | % Completion Based upon remaining epoxy plus phenolic hydroxyl equiv. |
|---|---|---|---|---|---|---|
| Comp. Expt. C | N.A. | N.A. | N.A. | N.A. | N.A. | N.A. |
| Comp. Expt. D | 0.0395 | 0.026 | 30.53 | 96.13 | 97.35 | 96.73 |
| Comp. Expt. E | N.A. | N.A. | N.A.. | N.A. | N.A. | N.A. |
| Comp. Expt. F | 0.331 | 0.300 | 3.17 | 67.55 | 69.39 | 68.45 |
| Comp. Expt. G | 0.055 | 0.0495 | 19.14 | 94.61 | 94.95 | 94.78 |
| Comp. Expt. H | 0.0534 | 0.033 | 23.3 | 94.8 | 96.63 | 95.7 |
| Comp. Expt. I | N.A. | N.A. | N.A. | N.A. | N.A. | N.A. |
| Example 6 | 0.047 | 0.0285 | 26.5 | 95.39 | 97.09 | 96.23 |
| Example 7 | 0.037 | 0.019 | 35.71 | 96.37 | 98.06 | 97.20 |
| Example 8 | 0.058 | 0.0185 | 25.75 | 94.31 | 98.05 | 96.12 |
| Example 9 | 0.085 | 0.0125 | 19.9 | 91.67 | 98.64 | 94.97 |
| Example 10 | 0.031 | 0.022 | 37.74 | 96.96 | 97.76 | 97.35 |

Analysis of Product

| Example of Comparative Experiment Number | $M_w$ | $M_n$ | $M_w/M_n$ | Epoxy Equiv. | Phenolic OH Equiv. | DP | % Completion Based upon Remaining Epoxy Equiv. | % Completion Based Upon Remaining Phenolic Hydroyl Equiv. | % Completion Based upon Remaining epoxy plus Phenolic Hydroxyl Equiv. |
|---|---|---|---|---|---|---|---|---|---|
| Comp. Expt. C | 27350 | 7100 | 3.85 | 0.0215 | 0.0266 | 42 | 97.89 | 97.34 | 97.62 |
| Comp. Expt. D | 26700 | 6300 | 4.2 | 0.023 | 0.0325 | 36.4 | 97.75 | 96.75 | 97.25 |
| Comp. Expt. E | 25500 | 5950 | 4.3 | 0.0215 | 0.0251 | 43.3 | 97.89 | 97.49 | 97.69 |
| Comp. Expt. F | 21900 | 5930 | 3.7 | 0.0213 | 0.0255 | 43.2 | 97.91 | 97.45 | 97.68 |
| Comp. Expt. G | 25450 | 6470 | 3.9 | 0.0215 | 0.025 | 43.4 | 97.89 | 97.5 | 97.7 |
| Comp. Expt. H | 22450 | 6855 | 3.3 | 0.0215 | 0.0245 | 43.9 | 97.89 | 97.55 | 97.72 |
| Comp. Expt. I | 28550 | 6600 | 4.3 | 0.0165 | 0.0232 | 50.9 | 98.38 | 97.68 | 98.03 |
| Example 6 | 24400 | 6730 | 3.6 | 0.019 | 0.0203 | 51.4 | 98.14 | 97.97 | 98.05 |
| Example 7 | 45500 | 9130 | 5.0 | 0.012 | 0.0175 | 68.5 | 98.82 | 98.25 | 98.54 |
| Example 8 | 38950 | 7510 | 5.2 | 0.013 | 0.0225 | 56.9 | 98.73 | 97.75 | 98.24 |
| Example 9 | 47750 | 7180 | 6.65 | 0.010 | 0.0147 | 81.8 | 99.02 | 98.53 | 98.78 |
| Example 10 | 38900 | 8170 | 4.8 | 0.0105 | 0.0205 | 65.2 | 98.97 | 97.95 | 98.47 |

[1] Time measured from start of reaction
[2] Bisphenol A added instead of halogenated bisphenol A for comparative purposes.
[3] TBBPA added at start of reaction for comparative purposes.
N.A. = not analyzed

EXAMPLE 11

Employing the previous procedure, a run was made in a 100 gallon stainless steel reaction vessel equipped with stirrer, temperature control and recording means, sample port, means for charging reaction components, means for applying vacuum and a means for purging with inert gas.

The charge to the reactor was as follows.
1. 159.6 lbs. (0.879 lb. equiv.) of Epoxy Resin A.
2. 95.8 lbs. (0.84 lb. equiv.) of IPBPA.
3. 916 grams (4 millimoles/eq. of IPBPA) of Catalyst A.
4. 112 lbs. of DOWANOL EE as a reaction solvent.
5. 460 grams (2 millimoles/eq of IPBPA) of Catalyst A
6. 5.86 lbs. (0.0215 lb. equiv.) of TBBPA.

Components 1, 2 and 35.4 lbs. of 4 were charged to the reactor, the reactor was purged with nitrogen and the contents were then heated to 97° C to dissolve the IPBPA. The temperature was then lowered to 45° C and Component 3 plus 29.6 lbs. of Component 4 were added. The contents were then heated and after the peak exotherm temperature of 183° C occurred, the temperature was maintained at 156°-168° C. After 2 hours after the peak exotherm temperature was reached, Component 6 plus 30 lbs. of Component 4 were added. Then 1 hour later Component 5 plus 17 lbs. of Component 4 were added. After 2 more hours, the reaction was considered complete and 443 lbs. of DOWANOL EE was added to dilute the product to 32% solids by weight. The product had the following analysis.

The analysis of the reaction mixture at the time the TBBPA was added was as follows.
0.037 = lb. equiv. of epoxy
0.164 = lb. equiv. of phenolic OH
32.2 = DP
95.8 = % Completion based upon remaining epoxy
98 = % Completion based upon remaining phenolic OH
96.9 = % Completion based upon remaining epoxy plus remaining phenolic OH The final reaction product had the following analysis.
34,900 = $M_w$
8,410 = $M_n$
4.15 = $M_w/M_n$
0.0159 = lb. equiv. of epoxy
0.0187 = lb. equiv. of phenolic OH
50.3 = DP
98.2 = % Completion based upon remaining epoxy
97.8 = % Completion based upon remaining phenolic OH
98 = % Completion based upon remaining epoxy plus remaining phenolic OH
$Z_3-Z_4$ = Gardner viscosity at 25° C.

I claim:

1. In a process for preparing high molecular weight polyhydroxyether resins by reacting in the presence of a suitable quantity of a suitable solvent or reaction medium, (A) an epoxy resin which is a glycidyl ether of a bisphenol with (B) a bisphenol in the presence of (C) a catalytic quantity of a suitable catalyst; the improvement which comprises adding, after the reaction between Components (A) and (B) is at least about 97% complete based upon the phenolic hydroxyl content, (D) from about 0.005 to about 0.12 phenolic hydroxyl equivalents per total phenolic hydroxyl equivalent contained in Components (B) and (D) of a halogenated bisphenol.

2. The process of claim 1 wherein the quantity of halogenated bisphenol added is from about 0.01 to about 0.05 hydroxyl equivalents and said bisphenol is added after the reaction is at least about 98% complete.

3. The process of claim 2 wherein Component (A) is a diglycidyl ether of bisphenol A and Component (B) is bisphenol A.

4. The process of claim 3 wherein Component (D) is tetrachlorobisphenol A or tetrabromobisphenol A.

5. The process of claim 4 wherein Component (A) is present in a stoichiometric excess over the total of Components (B) and (D).

6. The process of claim 5 wherein Component (D) is tetrabromobisphenol A.

* * * * *